(12) United States Patent
Sawada

(10) Patent No.: US 8,325,722 B2
(45) Date of Patent: Dec. 4, 2012

(54) COMMUNICATION APPARATUS, COMMUNICATION CONTROL METHOD AND COMPUTER-READABLE STORAGE MEDIUM

(75) Inventor: Tetsuya Sawada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

(21) Appl. No.: 12/566,129

(22) Filed: Sep. 24, 2009

(65) Prior Publication Data

US 2010/0103931 A1 Apr. 29, 2010

(30) Foreign Application Priority Data

Oct. 28, 2008 (JP) ................................. 2008-277374

(51) Int. Cl.
*H04L 12/56* (2006.01)
(52) U.S. Cl. ........ 370/389; 370/331; 370/333; 370/465; 455/161.1; 455/436; 455/443
(58) Field of Classification Search .................. 370/252, 370/329, 333, 429; 710/52, 29
See application file for complete search history.

(56) References Cited

U.S. PATENT DOCUMENTS

| | | | | |
|---|---|---|---|---|
| 6,715,007 | B1* | 3/2004 | Williams et al. | 710/52 |
| 2004/0017790 | A1* | 1/2004 | del Prado et al. | 370/333 |
| 2004/0202113 | A1* | 10/2004 | Moon et al. | 370/252 |
| 2005/0232212 | A1* | 10/2005 | Kang et al. | 370/338 |
| 2009/0168795 | A1* | 7/2009 | Segel | 370/429 |

FOREIGN PATENT DOCUMENTS

| | | | |
|---|---|---|---|
| GB | 2 372 406 A | * | 2/2001 |
| JP | 2001-094572 | | 4/2001 |
| JP | 2005-086623 | | 3/2005 |
| JP | 2007-053765 A | | 3/2007 |
| JP | 2007053765 | * | 3/2007 |

OTHER PUBLICATIONS

"LLTD: Link Layer Topology Discovery Protocol", A Windows Rally Specification, Microsoft Windows, Version 1.0.9, Sep. 15, 2006, pp. 1-63.

* cited by examiner

*Primary Examiner* — Robert Wilson
*Assistant Examiner* — Mohamed Kamara
(74) *Attorney, Agent, or Firm* — Fitzpatrick, Cella, Harper & Scinto

(57) ABSTRACT

A local communication apparatus for communicating with another apparatus via a relay apparatus receives communication interface information that has been transmitted by the other apparatus, acquires information relating to the communication rate of the local apparatus, compares the received communication interface information with the acquired information relating to the communication rate of the local apparatus, and switches over a connection-destination relay apparatus based upon result of the comparison.

10 Claims, 8 Drawing Sheets

| ADDRESS INFORMATION | MEDIA INFORMATION | RATE INFORMATION |
|---|---|---|
| 00:00:85:00:01:12 | 802.11 STA,Infrastructure mode,BSSID=00:00:85:00:01:02 | Max=54M,Link=54M |
| 00:00:85:00:01:13 | 802.11 STA,Infrastructure mode,BSSID=00:00:85:00:01:03 | Max=54M,Link=12M |

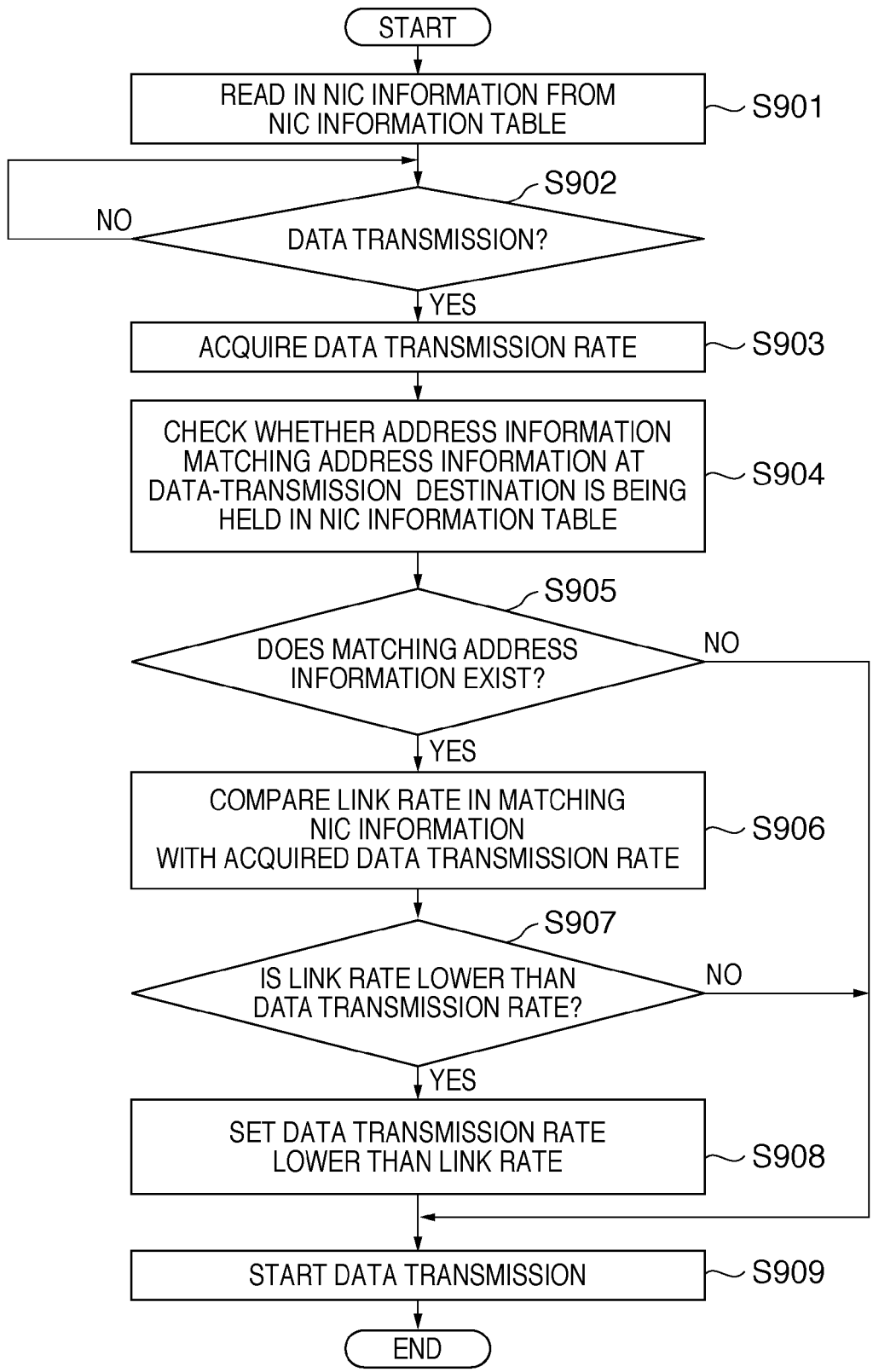

COMMUNICATION APPARATUS, COMMUNICATION CONTROL METHOD AND COMPUTER-READABLE STORAGE MEDIUM

BACKGROUND OF THE INVENTION

1. Field of the Invention

The present invention relates to a communication apparatus, a communication control method and a computer-readable storage medium.

2. Description of the Related Art

Wired and wireless communication environments have been constructed in business enterprises, public agencies, schools and homes, etc. For example, there are instances where a communication environment is formed for sending and receiving information among a plurality of stations via access points. With regard to such communication, a technique for transmitting information concerning a plurality of adjacent access points autonomously or in response to a request from another apparatus is known in the art (see the specifications of Japanese Patent Laid-Open Nos. 2001-094572 and 2005-086623). Further, a technique whereby a communication apparatus transmits its own NIC (Network Interface Card) information autonomously or in response to a request from another apparatus is known in the art (Link Layer Topology Discovery Protocol Specification, Microsoft). This technology is applicable irrespective of whether the environment is wired or wireless.

The prior art is such that communication interface information that has been transmitted by another apparatus is not always fully exploited.

SUMMARY OF THE INVENTION

The present invention provides a communication apparatus, communication control method and computer-readable storage medium adapted in such a manner that communication control is carried out utilizing communication interface information that has been transmitted by another apparatus.

According to a first aspect of the present invention, there is provided a communication apparatus for communicating with another apparatus via a plurality of relay apparatuses, comprising: a reception unit configured to receive communication interface information that has been transmitted by the other communication apparatus; an acquisition unit configured to acquire information relating to the communication rate of its own apparatus; a comparison unit configured to compare the communication interface information that has been received by the reception unit with the information relating to the communication rate of its own apparatus acquired by the acquisition unit; and a switching unit configured to switch a connection-destination relay apparatus based upon result of the comparison by the comparison unit.

According to a second aspect of the present invention, there is provided a communication apparatus for communicating with another apparatus via a relay apparatus, comprising: a reception unit configured to receive communication interface information that has been transmitted by the other communication apparatus; an acquisition unit configured to acquire information indicating the data transmission rate of data prior to the transmission of the data; a comparison unit configured to compare communication interface information of the other apparatus that will be the data-transmission destination, which communication interface information has been received by the reception unit when data is transmitted, with information indicating the data transmission rate that has been acquired by the acquisition unit; and a changing unit configured to change the rate of data transmission to the other apparatus, which is be the data-transmission destination, based upon result of the comparison by the comparison unit.

According to a third aspect of the present invention, there is provided a method of controlling communication of a communication apparatus for communicating with another apparatus via a plurality of relay apparatuses, comprising: receiving communication interface information that has been transmitted by the other communication apparatus; acquiring information relating to the communication rate of its own apparatus; comparing the communication interface information that has been received at the reception step with the information relating to the communication rate of its own apparatus acquired by the acquisition step; and switching a connection-destination relay apparatus based upon result of the comparison at the comparison step.

According to a fourth aspect of the present invention, there is provided a method of controlling communication of a communication apparatus for communicating with another apparatus via a relay apparatus, comprising: receiving communication interface information that has been transmitted by the other communication apparatus; acquiring information indicating the data transmission rate of data prior to the transmission of the data; comparing communication interface information of the other apparatus that will be the data-transmission destination, which communication interface information has been received at the reception step when data is transmitted, with information indicating the data transmission rate that has been acquired at the acquisition step; and changing the rate of data transmission to the other apparatus, which is be the data-transmission destination, based upon result of the comparison at the comparison step.

According to a fifth aspect of the present invention, there is provided a computer-readable storage medium storing a computer program, the program causing a computer incorporated in a communication apparatus for communicating with another apparatus via a plurality relay apparatuses, to function as the following: a reception unit configured to receive communication interface information that has been transmitted by the other communication apparatus; an acquisition unit configured to acquire information relating to the communication rate of its own apparatus; a comparison unit configured to compare the communication interface information that has been received by the reception unit with the information relating to the communication rate of its own apparatus acquired by the acquisition unit; and a switching unit configured to switch a connection-destination relay apparatus based upon result of the comparison by the comparison unit.

According to a sixth aspect of the present invention, there is provided a computer-readable storage medium storing a computer program, the program causing a computer incorporated in a communication apparatus for communicating with another apparatus via a relay apparatus, to function as the following: a reception unit configured to receive communication interface information that has been transmitted by the other communication apparatus; an acquisition unit configured to acquire information indicating the data transmission rate of data prior to the transmission of the data; a comparison unit configured to compare communication interface information of the other apparatus that will be the data-transmission destination, which communication interface information has been received by the reception unit when data is transmitted, with information indicating the data transmission rate that has been acquired by the acquisition unit; and a changing unit configured to change the rate of data transmission to the other apparatus, which is be the data-transmission destination, based upon result of the comparison by the comparison unit.

Further features of the present invention will become apparent from the following description of exemplary embodiments with reference to the attached drawings.

BRIEF DESCRIPTION OF THE DRAWINGS

FIG. 6 is a diagram illustrating an example of the content of an NIC information table;

FIG. 9 is a flowchart illustrating an example of the flow of processing when data is transmitted in a STA 111 according to the second embodiment.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

An embodiment of a communication apparatus, communication control method and program according to the present invention will now be described in detail with reference to the accompanying drawings. In this embodiment, a communication system constituted by a wireless LAN (Local-Area Network) will be described as an example. However, the present invention may just as well be applied to a communication system constituted by a wired network.

(First Embodiment)

Figure 1:
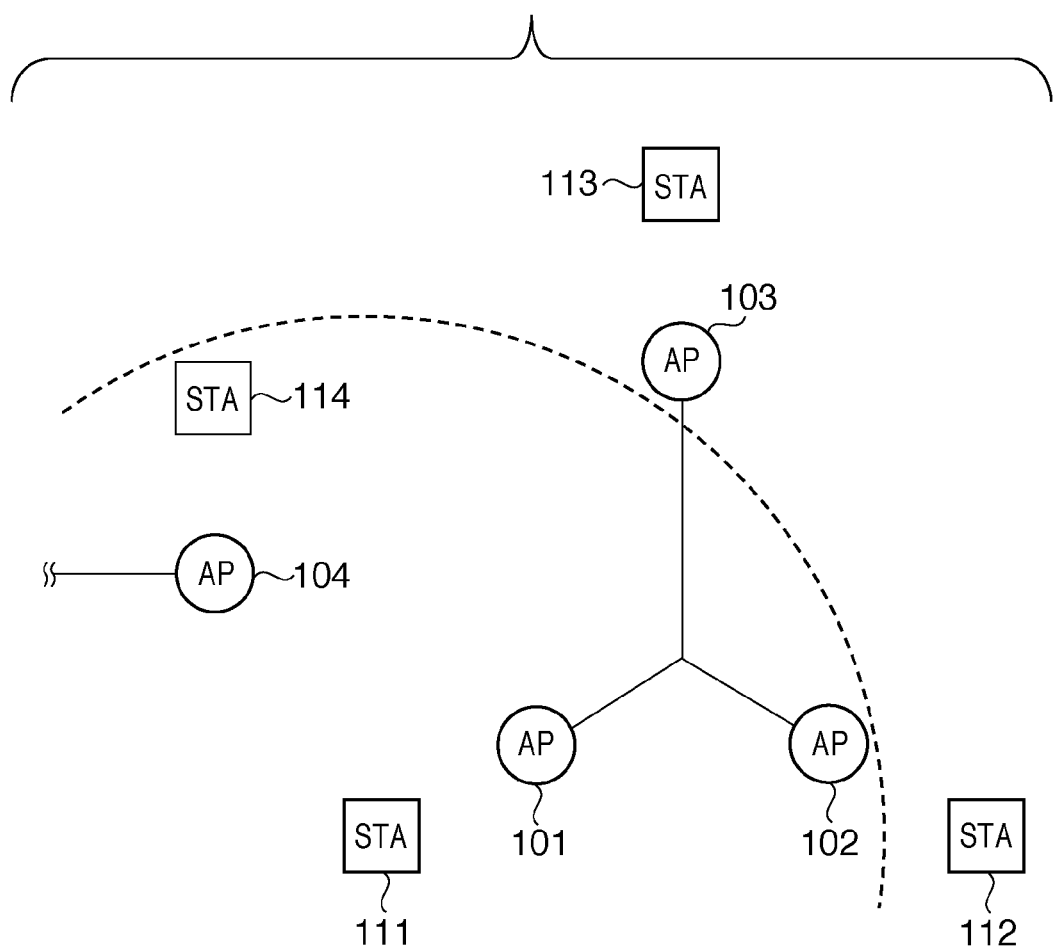
FIG. 1 is a diagram illustrating an example of the overall configuration of a communication system according to an embodiment of the present invention.

FIG. 1 is a diagram illustrating an example of the overall configuration of a communication system according to an embodiment of the present invention.

Reference numerals 101 to 104 denote communication apparatuses (each referred to as an "AP" below) that function as access points (relay apparatuses). Reference numerals 111 to 114 denote communication apparatuses (each referred to as a "STA" below) that function as stations. These communication apparatuses (101 to 104, 111 to 114) send and receive information to and from other apparatuses by communication compliant with, for example, IEEE 802.11.

As shown in FIG. 1, STAs 111, 112, 113 and 114 are associated with APs 101, 102, 103 and 104, respectively. Further, the APs 101 to 103 are connected by wired communication compliant with, e.g., IEEE 802.3. The circular arc represented by the dashed line in FIG. 1 indicates the zone within which the STA 111 is capable of communicating wirelessly. For example, AP 102 is situated in the zone within which the STA 111 is capable of communicating wirelessly. The STA 111 and AP 102 are capable of detecting each other by mutually exchanging a probe request and the response thereto. The STA 111 can also be associated with the AP 102.

In the description of this embodiment, it is assumed that the STA 111 has been constructed to have the characterizing features of this embodiment and that the other STAs 112 to 114 have a construction similar to that of the prior art.

The foregoing is a description of the overall configuration of a communication system according to this embodiment. It should be noted that each of the above-described communication apparatuses (APs, STAs) is constituted by a computer. The computer has main control means such as a CPU and storage means such as a ROM (read-only memory) and a RAM (random-access memory). The computer may further include communication means such as a network card, and input/output means such as a display or touch-sensitive panel. It should be noted that these are connected as by a bus and are controlled by the main control means executing a program that has been stored in the storage means.

Figure 2:
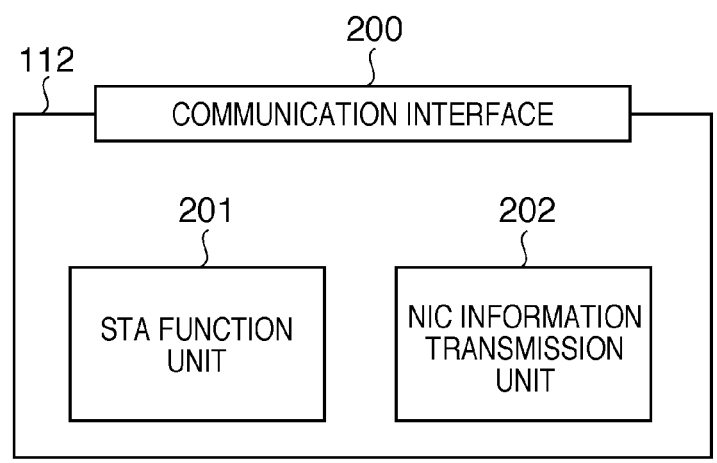
FIG. 2 is a diagram illustrating an example of the configuration of a STA 112 shown in FIG. 1.

FIG. 2 is a diagram illustrating an example of the configuration of a STA according to the prior art. Specifically, the STAs 112 to 114 have a common construction and the STA 112 will be described as a representative example thereof.

A communication interface 200 controls communication with another apparatus. That is, communication in the STA 112 is performed via the communication interface 200. The communication interface 200 is constituted by an NIC (Network Interface Card).

A STA function unit 201 provides an ordinary STA function. By using the STA function unit 201, the STAs 112 to 114 are capable of communicating with the associated APs and with another apparatus connected thereto directly or indirectly. In other words, in the configuration of the network shown in FIG. 1, the STA 112 can communicate with the APs 101 to 103 and with the STAs 111 and 113.

Figure 3:
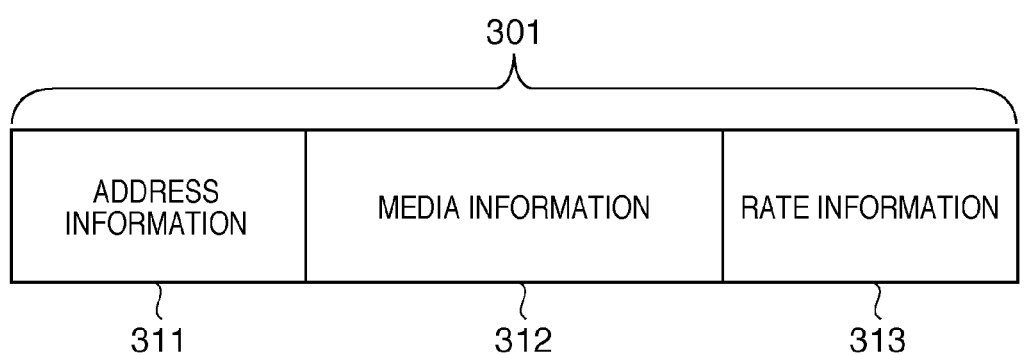
FIG. 3 is a diagram illustrating an example of communication interface information (NIC information)

An NIC information transmission unit 202 generates and transmits communication interface information (referred to as "NIC information" in this embodiment) autonomously or in response to a request from another apparatus. The NIC information comprises information shown in FIG. 3, by way of example. Broadly classified, the overall NIC information, which is indicated at 301, includes three information elements, namely address information 311, media information 312 and rate information 313.

The address information 311 includes MAC (Media Access Control) address information. It should be noted that the address information 311 may further include IP address information.

The media-information 312 includes media-type information and media-details information conforming to the media-type information. The media-type information is information for specifying media type such as 802.3 or 802.11, by way of example. The media-type information specifies the media details. For example, if the media type is 802.11, then the information is information indicative of AP or STA, mode information and BSSID information, etc.

The rate information 313 includes maximum rate information and link rate information. Maximum rate information is information that indicates the maximum rate that can be attained and is a measure of the capability of the communication interface (i.e., NIC). Link rate information is information that indicates the rate of communication between the communication interface and the AP to which this communication interface has been connected.

Figure 4:
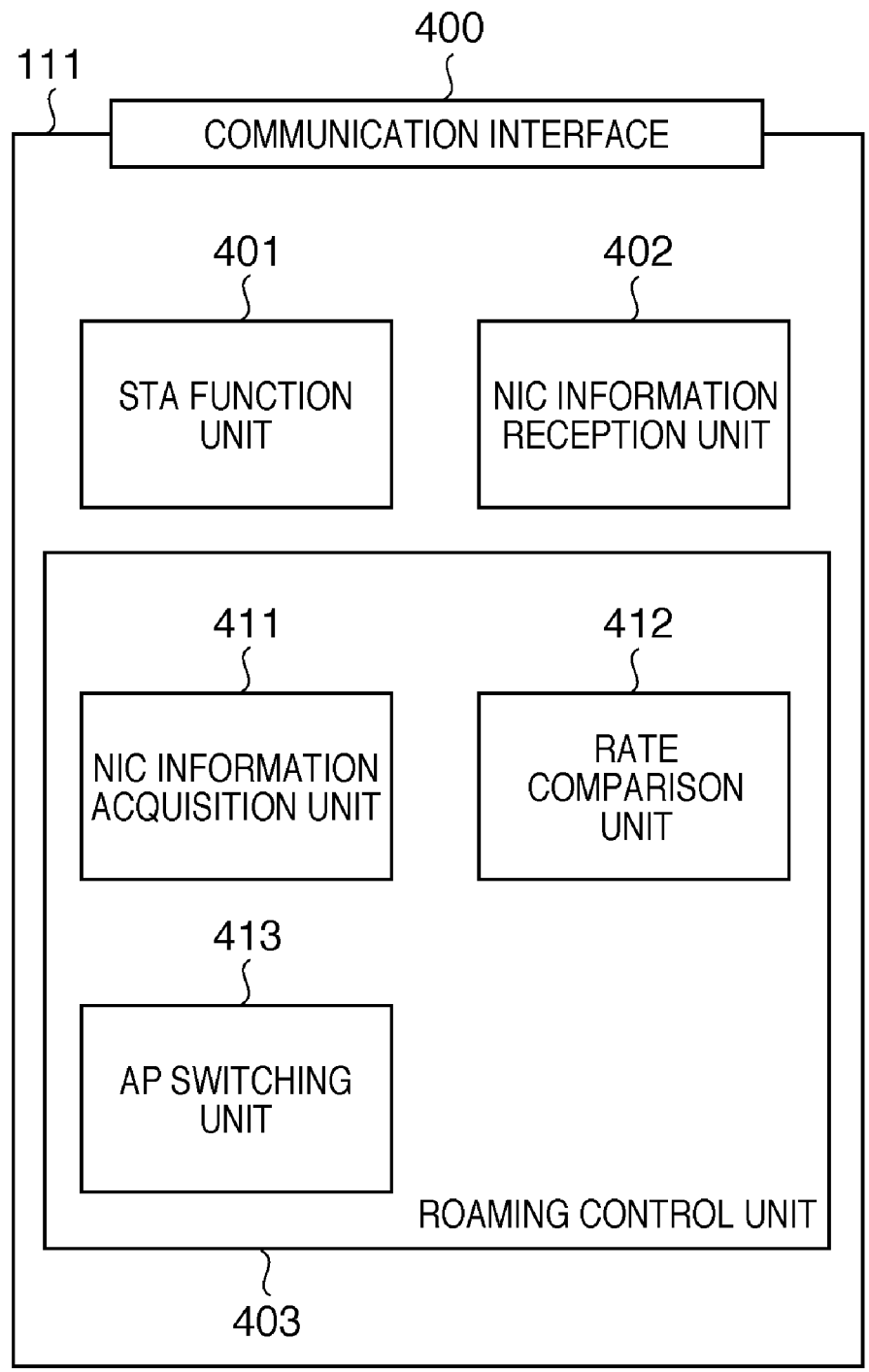
FIG. 4 is a diagram illustrating an example of the configuration of a STA 111 shown in FIG. 1.

FIG. 4 is a diagram illustrating an example of the configuration of the STA 111.

The STA 111 has a communication interface 400 for controlling communication with another apparatus. That is, communication in the STA 111 is performed via the communication interface 400. The communication interface 400 is constituted by, for example, an NIC.

A STA function unit 401 provides an ordinary STA function. That is, the STA function unit 401 performs a function similar to that of the STA function unit 201 described above. By using the STA function unit 401, the STA 111 is capable of communicating with the associated AP and with another apparatus connected thereto directly or indirectly. In other words, in the configuration of the network shown in FIG. 1, the STA 111 can communicate with the APs 101 to 103 and with the STAs 112 and 113.

An NIC information reception unit 402 receives NIC information. That is, the NIC information reception unit 402 receives NIC information sent from the STAs 112 to 114.

A roaming control unit 403 has an NIC information acquisition unit 411, a rate comparison unit 412 and an AP switching unit 413. The NIC information acquisition unit 411 acquires its own NIC information. The acquisition is carried out by comparing NIC information that has been sent from the other apparatuses (STAs 112 to 114) with the NIC information of the NIC information acquisition unit 411. It should be noted that the NIC information acquisition unit 411 has a function for generating NIC information. As a result of this function, the NIC information acquisition unit 411 acquires its own NIC information.

The rate comparison unit 412 compares the link rate information contained in the NIC information that has been sent from the other apparatuses (STAs 112 to 114) with the link rate information contained in its own NIC information.

The AP switching unit 413 switches over the AP at the connection destination, namely the associated AP. This processing is executed based upon the result of the comparison performed by the rate comparison unit 412. More specifically, the AP switching unit 413 switches over the associated AP in a case where the link rate information (i.e., the link rate) within the NIC information sent from another apparatus (STAs 112 to 114) is higher than the link rate of its own STA. It should be noted that the switching of the AP by the AP switching unit 413 is carried out by controlling the STA function unit 401.

Figure 5:
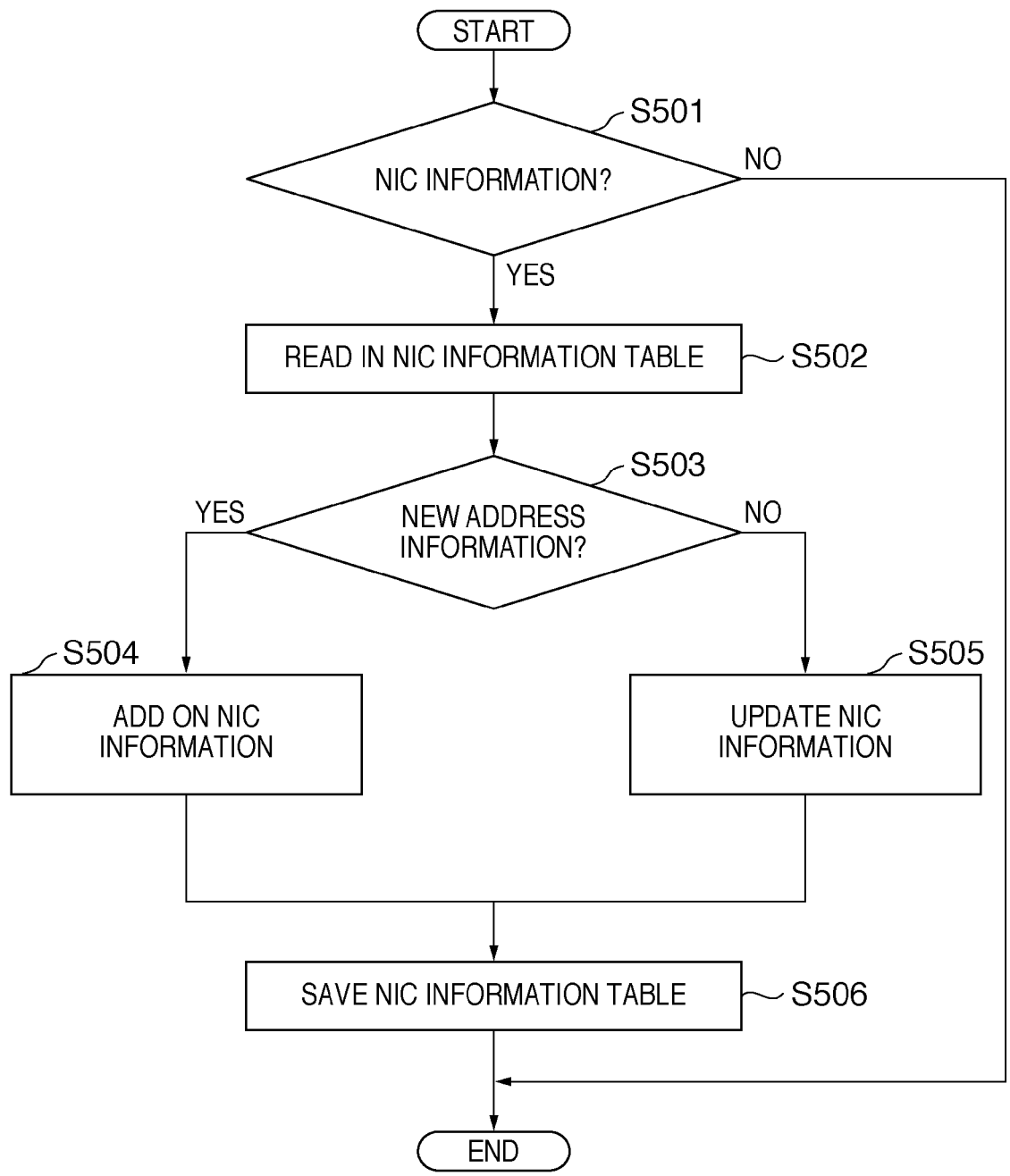
FIG. 5 is a flowchart illustrating an example of the flow of processing when data is received at a STA 111 shown in FIG. 1.

An example of the flow of processing when data is received at the STA 111 of FIG. 1 will be described with reference to FIG. 5. This processing starts when the STA 111, which is already associated with any one of the APs, receives data from another STA.

When this processing starts, the STA 111 causes NIC information reception unit 402 to receive the data and examine the format of the received data. The STA 111 then checks to determine whether the received data is NIC information (S501).

If the result of the determination is that the received data is not NIC information ("NO" at S501), the STA 111 quits this processing. If the received data is NIC information ("YES" at S501), then the STA 111 causes the NIC information reception unit 402 to read in an NIC information table (S502). The NIC information table holds NIC information that has been sent from other apparatuses. This table has been stored in a memory such as a RAM. The details of the NIC information table will be described later.

After the NIC information is read in, the STA 111 causes the NIC information reception unit 402 to compare address information contained in the received NIC information with address information contained in the NIC information held in the NIC information table (S503). If the result of the comparison is that the items of compared information do not match ("YES" at S503), then the STA 111 construes that new NIC information has been received and adds the received NIC information to the NIC information table (S504). Further, if the items of compared NIC information match ("NO" at S503), then the STA 111 construes that already stored NIC information has been received again and updates the NIC information table in accordance with the received NIC information (S505). The STA 111 then saves the NIC information table in a memory, etc., at step S506 and terminates processing.

FIG. 6 is a diagram illustrating an example of the content of an NIC information table. It should be noted that FIG. 6 illustrates the content of the NIC information table held by the STA 111.

It is assumed that the MAC address of the STA 112 is "00:00:85:00:01:12" and that the MAC address of the STA 113 is "00:00:85:00:01:13". Further, it is assumed that the MAC address of the AP 102 is "00:00:85:00:01:02" and that the MAC address of the AP 103 is "00:00:85:00:01:03".

Accordingly, an NIC information table 601 shown in FIG. 6 holds an indication that the maximum rate of the communication interface 200 of STA 112 is 54 Mbps and an indication that the STA 112 has been connected to the AP 102 at the link rate of 54 Mbps. Further, the NIC information table 601 holds an indication that the maximum rate of the communication interface 200 of STA 113 is 54 Mbps and an indication that the STA 113 has been connected to the AP 103 at the link rate of 12 Mbps.

Figure 7:
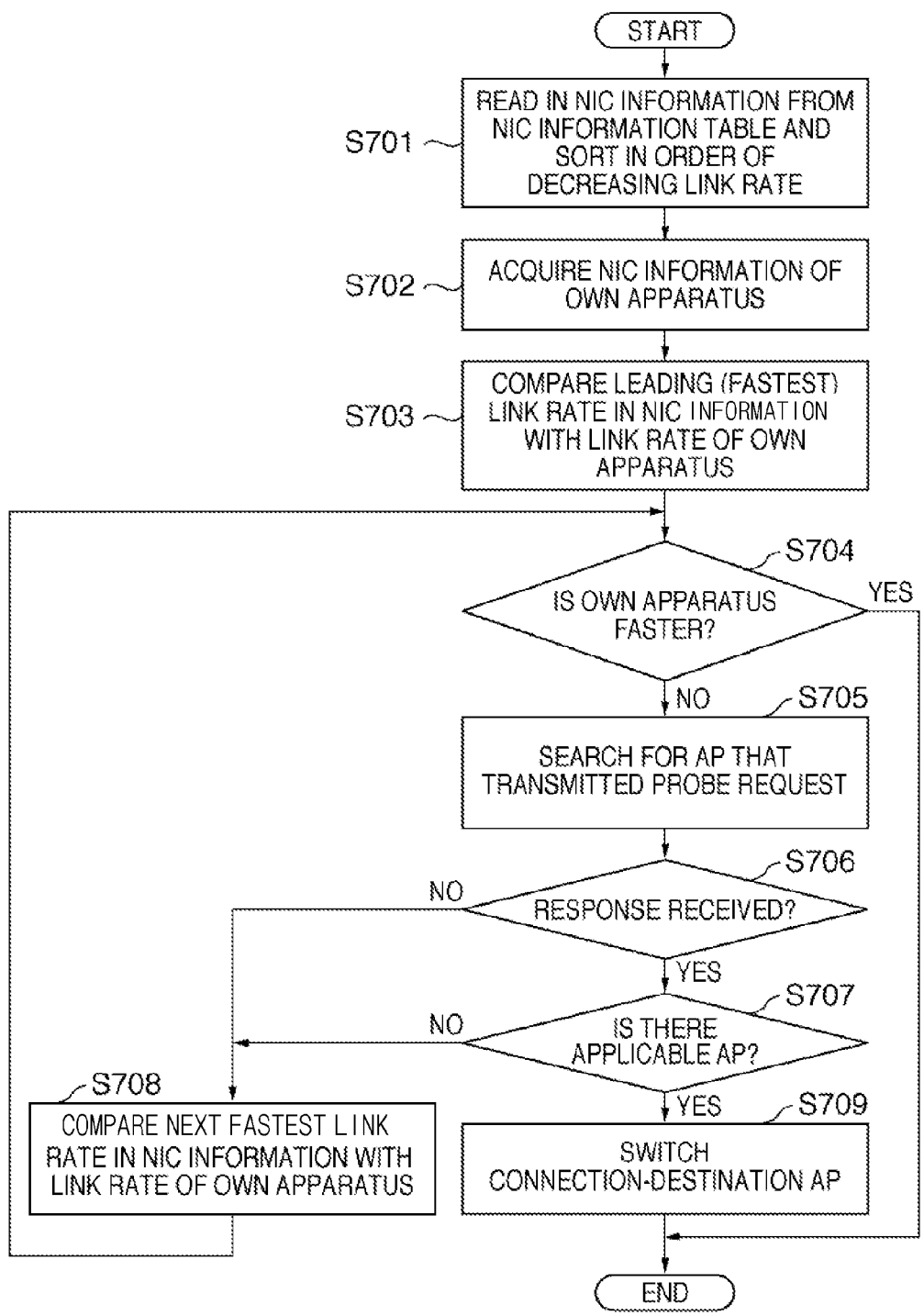
FIG. 7 is a flowchart illustrating an example of the flow of processing when a connection-destination AP is switched at a STA 111 shown in FIG. 1.

Next, reference will be had to FIG. 7 to describe an example of the flow of processing when a connection-destination AP is switched in the STA 111 shown in FIG. 1.

This processing starts in a case where, for example, the user specifies start of this processing at the STA 111. It should be noted that an arrangement may be adopted in which this processing is started by a method other than this method. For example, in a case where it has been so arranged that the NIC information acquisition unit 411 acquires the NIC information of its own STA periodically, the processing is started if the link rate of the NIC information of its own STA is smaller than a predetermined value.

When this processing starts, the STA 111 causes the roaming control unit 403 to read in the NIC information table and sort each of the items of NIC information in order of decreasing link rate (S701). When sorting is completed, the STA 111 causes the NIC information acquisition unit 411 to acquire its own NIC information (S702).

Next, the STA 111 causes the rate comparison unit 412 to compare the link rate of its own NIC information with the fastest link rate, namely the link rate of the NIC information placed at the head of the items of NIC information by the sorting operation at step S701 (S703). If the result of the comparison is that the link rate of its own STA is faster ("YES" at S704), this processing is exited. On the other hand, if the link rate in the applicable NIC information is faster than the link rate of the STA 111 ("NO" at S704), then the STA 111 transmits a probe request to the neighboring APs and searches for an AP that will be a roaming-destination candidate (S705).

If a response to the probe request is not sent back ("NO" at S706), the STA 111 compares the next fastest link rate in the NIC information with its own link rate (S708) through a procedure similar to that described above, after which control returns to the processing of step S704. On the other hand, if a response is received ("YES" at S706), the STA 111 causes the roaming control unit 403 to determine whether this response is a response from the applicable AP. This determination is carried out based upon whether the media information of the AP that responded matches the media information in the NIC information that was the object of comparison at S703. By virtue of this processing, a determination is made as to whether it was possible to find an AP associated with another STA determined to have a link rate faster than that of the STA 111.

If the result of the determination is that such an AP could not be found ("NO" at S707), then the STA 111 compares the next fastest link rate in the NIC information with its own link rate (S708) through a procedure similar to that described above, after which control returns to the processing of step S704. On the other hand, if the applicable AP could be found ("YES" at S707), then the STA 111 causes the AP switching unit 413 to switch association to this AP (S709) and terminates processing.

A specific example of the foregoing processing will be described. For example, assume that the maximum rate of the NIC information of the STA 111 is 54 Mbps, that the link rate is 36 Mbps and that the NIC information table is in the state shown in FIG. 6. Further, the STA 111 is associated with the image sensing unit 101. When the above-described processing is executed in this case, the STA 111 switches the connection to AP 102 (MAC address "00:00:85:00:01:02") whose link rate is faster than that of the AP 101 currently connected. By thus switching connection destination to the AP having the faster link rate, data communication can be performed at a higher rate. Preferably, after switching is performed, the NIC information of the STA 111 may be acquired again, it may be determined whether the link rate is higher than before the switch and, if the rate is not higher, the STA 111 may be re-associated with the AP that prevailed before the switch.

(Second Embodiment)

A second embodiment of the present invention will now be described. In the second embodiment, a traffic control unit 803 is provided instead of the roaming control unit 403 in the arrangement of the STA (the STA 111) described in the first embodiment. It should be noted that the overall arrangement according to the second embodiment is similar to that shown in FIG. 1 of the first embodiment and need not be described again.

Figure 8:
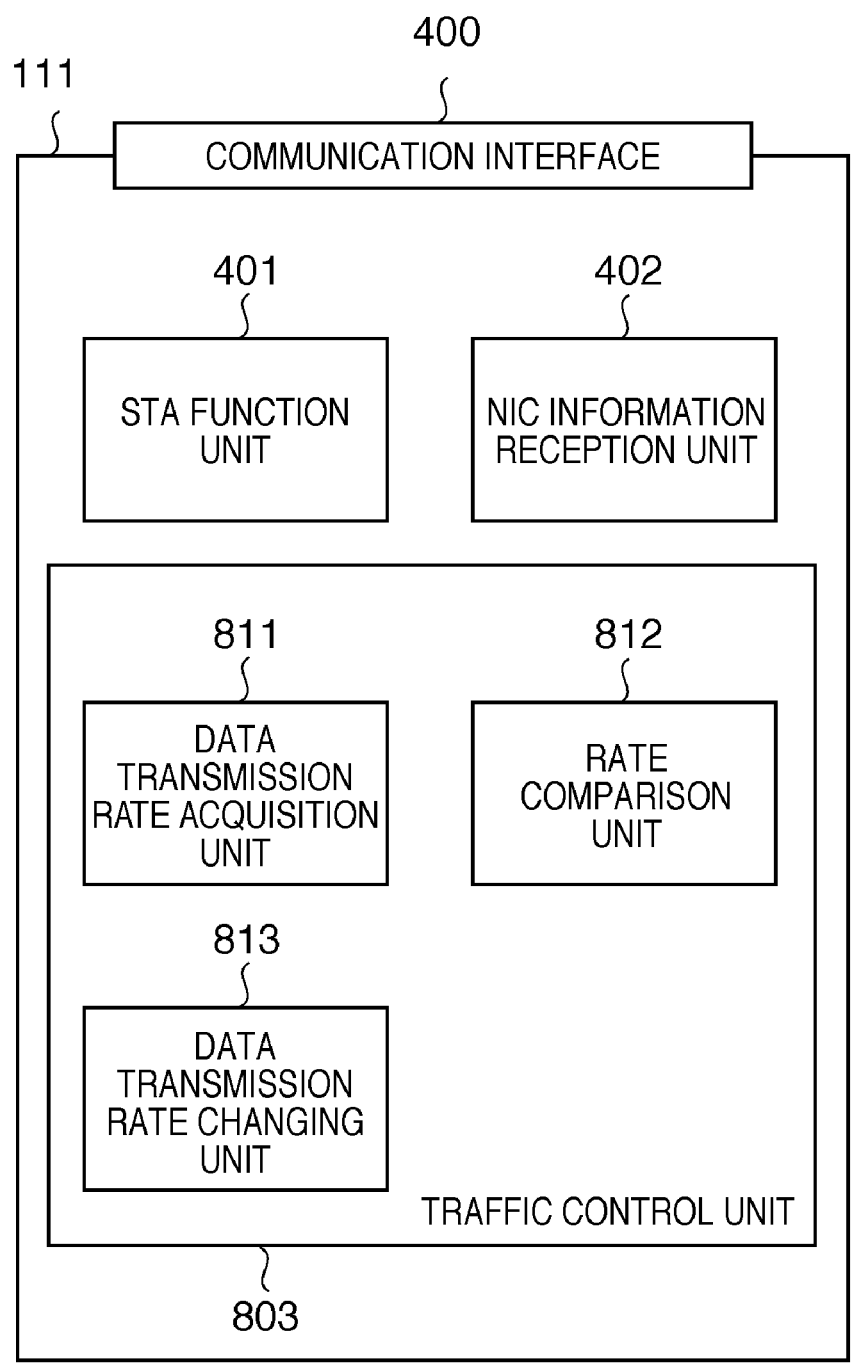
FIG. 8 is a diagram illustrating an example of the configuration of a STA 111 according to a second embodiment of the present invention.

FIG. 8 is a diagram illustrating an example of the configuration of a STA (STA 111) according to the second embodiment. It should be noted that components in FIG. 8 identical with those shown in FIG. 4 of the first embodiment are designated by like reference characters and need not be described again.

The traffic control unit 803 includes a data transmission rate acquisition unit 811, a rate comparison unit 812 and a data transmission rate changing unit 813. The data transmission rate acquisition unit 811 acquires data transmission rate information concerning its own STA. This acquisition is performed in order to make a comparison with items of link rate information contained in NIC information transmitted from the other apparatuses (STA 112 to 114). The acquisition of data transmission rate information by the data transmission rate acquisition unit 811 is carried out by acquiring the information from a data transmission application before prior to data transmission, by way of example. It is assumed that the data transmission application would have a function for giving notification of data transmission rate, and a function for changing the data transmission rate, etc.

The rate comparison unit 812 compares the link rate information contained in the NIC information that has been sent from the other apparatuses (STAs 112 to 114) with the data transmission rate information of its own STA.

The data transmission rate changing unit 813 changes the data transmission rate. Specifically, if link rate information (i.e., the link rate) contained in NIC information that has been sent from an apparatus at the destination of a data transmission is slower than the data transmission rate information (i.e., the data transmission rate) of the STA 111, the data transmission rate changing unit 813 lowers the data transmission rate to the transmission destination. This lowering of the data transmission rate can be implemented by changing the transmission rate at the time of data transmission by the data transmission application.

Reference will be had to FIG. 9 to describe an example of the flow of processing when data is transmitted in the STA 111 according to the second embodiment. This processing is started in the STA 111 when a data transmission application is launched, by way of example.

When the processing starts, the STA 111 causes the traffic control unit 803 to read in the NIC information table (S901). The STA 111 stands by until a data transmission occurs ("NO" at S902). When the data transmission occurs ("YES" at S902), the STA 111 causes the data transmission rate acquisition unit 811 to acquire the data transmission rate when this data is transmitted (S903).

Thereafter, the STA 111 causes the traffic control unit 803 to determine whether address information matching the address information of the data-transmission destination is being held in the NIC information table (S904).

If the result of the determination is that there is no matching address information ("NO" at S905), the STA 111 starts the data transmission as is (S909) and then terminates processing. If matching address information exists ("YES" at S905), then the STA 111 causes the rate comparison unit 812 to compare the link rate contained in the matching NIC information with the data transmission rate acquired at S903 (S906).

If the result of the comparison indicates that the link rate contained in the matching NIC information is slower than the acquired data transmission rate ("YES" at S907), then the STA 111 causes the data transmission rate changing unit 813 to set the transmission rate of the data to be lower than the link rate (S908). The STA 111 starts data transmission at the rate that has been set (S909). The STA 111 then terminates this processing.

A specific example of the foregoing processing will be described. For example, assume that the transmission data in the data transmission application is 24-Mbps high-definition video and that the NIC information table is in the state shown in FIG. 6. Further, assume that the STA 111 has started with the STA 113 as its communicating party. When the above-described processing is executed in this case, the STA 111 makes a change to standard video in which the data transmission rate has been lowered to 12 Mbps, etc., and executes transmission processing by the data transmission application.

From the fact that the link rate of the transmission destination is lower than the data transmission rate, it can be surmised that there has been an increase in traffic between the STA 113 at the transmission destination and the AP 103. Even if a fast data transmission rate is maintained in such case, no improvement in throughput can be expected. Accordingly, by changing the data transmission rate to a low rate, it is possible to perform ideal communication that takes traffic in the overall network into account while alleviating the processing load on the STA 111.

Thus, in each of the foregoing embodiments, superior communication can be carried out by exercising communication control utilizing communication interface information that has been transmitted by another apparatus.

Typical embodiments of the present invention have been described above. However, the present invention is not limited to the aforementioned and illustrated embodiments, and can be properly modified without departing from the scope of the invention.

The present invention can adopt embodiments in the forms of, for example, a system, apparatus, method, program, and storage medium. The present invention may be applied to either a system constituted by a plurality of devices, or an apparatus consisting of a single device.

In accordance with the present invention, communication control is carried out utilizing communication interface information that has been transmitted by another apparatus. As a result, communication can be performed better in comparison with a case where the arrangement of the present invention is not employed.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-277374, filed Oct. 28, 2008, which is hereby incorporated by reference herein in its entirety.

What is claimed is:

1. A communication apparatus, comprising:
a reception unit configured to receive communication interface information which is related to a first base station, to which another communication apparatus is connected;
a determination unit configured to determine a first communication condition of the another communication apparatus based upon the received communication interface information, and determine a second communication condition of the communication apparatus which is connected to a second base station;
a search unit configured to search for the first base station according to the first communication condition and the second communication condition; and
a switching unit configured to switch a connection-destination from the second base station to the first base station according to a search result of the search unit.

2. The communication apparatus according to claim 1, wherein the communication interface information includes information indicating a link rate of the another communication apparatus connected to the first base station, and
wherein the determination unit determines the link rate of the another communication apparatus.

3. The communication apparatus according to claim 1, wherein the communication interface information includes information indicating a link rate of the another communication apparatus connected to the first base station, and
wherein, in a case where the link rate of the another communication apparatus is faster than the link rate of the communication apparatus, the search unit searches for the first base station.

4. A communication apparatus, comprising:
a reception unit configured to receive communication interface information from another communication apparatus, which is a communication partner of the communication apparatus, wherein the communication interface information is related to a first base station to which the another communication apparatus is connected;
a determination unit configured to determine a first communication condition of the another communication apparatus, based upon the received communication interface information, and a second communication condition of the communication apparatus which is connected to a second base station; and
a changing unit configured to change a rate of data transmission to be used for communicating with the another communication apparatus based upon a result of the determination by the determination unit.

5. A method of controlling communication of a communication apparatus, comprising the steps of:
receiving communication interface information which is related to a first base station, to which another communication apparatus is connected;
determining a first communication condition of the another communication apparatus based upon the received communication interface information, and determining a second communication condition of the communication apparatus which is connected to a second base station;
searching for the first base station according to the first communication condition and the second communication condition; and
switching a connection-destination from the second base station to the first base station according to a search result of the searching step.

6. A method of controlling communication of a communication apparatus, comprising the steps of:
receiving communication interface information from another communication apparatus, which is a communication partner of the communication apparatus, wherein the communication interface information is related to a first base station to which another communication apparatus is connected;
determining a first communication condition of the another communication apparatus, based upon the received communication interface information, and a second communication condition of the communication apparatus which is connected to a second base station; and
changing the rate of data transmission to be used for communicating with the another communication apparatus based upon a result of the determination in the determining step.

7. A non-transitory computer-readable storage medium storing a computer program, the program causing a computer incorporated in a communication apparatus-to execute a method comprising:
receiving communication interface information which is related to a first base station, to which another communication apparatus is connected;
determining a first communication condition of the another communication apparatus based upon the received communication interface information, and determining a second communication condition of the communication apparatus which is connected to a second base station;

searching for the first base station according to the first communication condition and the second communication condition; and switching a connection-destination from the second base station to the first base station according to a search result of the searching step.

8. A non-transitory computer-readable storage medium storing a computer program, the program causing a computer incorporated in a communication apparatus-to execute a method comprising:

receiving communication interface information from another communication apparatus, which is a communication partner of the communication apparatus, wherein the communication interface information is related to a first base station to which another communication apparatus is connected;

determining a first communication condition of the another communication apparatus, based upon the received communication interface information, and determining a second communication condition of the communication apparatus which is connected to a second base station; and changing the rate of data transmission to be used for communicating with the another communication apparatus based upon a result of the determination in the determining step.

9. The communication apparatus according to claim 4, wherein the communication interface information includes information indicating a link rate of the another communication apparatus connected to the first base station, and wherein the determination unit determines whether or not to change the data transmission rate based upon the link rate of the another communication apparatus.

10. The communication apparatus according to claim 4, wherein the communication interface information includes information indicating a link rate of the another communication apparatus connected to the first base station, and wherein in a case where the link rate of the another communication apparatus is slower than the data transmission rate of the communication apparatus, the determination unit determines that the rate of data transmission to be used for communicating with the another communication apparatus will be changed to a rate lower than the link rate of the another communication apparatus.

* * * * *